United States Patent
Yamaoka et al.

(10) Patent No.: US 7,681,560 B2
(45) Date of Patent: Mar. 23, 2010

(54) EXHAUST GAS RECIRCULATION SYSTEM

(75) Inventors: Shiro Yamaoka, Hitachi (JP); Eiichiro Ohata, Kasama (JP); Jun Kubo, Hitachinaka (JP); Noboru Tokuyasu, Hitachinaka (JP); Toshiki Otsuki, Kyoto (JP); Hiroaki Hoshika, Hitachiohmiya (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 11/943,047

(22) Filed: Nov. 20, 2007

(65) Prior Publication Data

US 2008/0178853 A1  Jul. 31, 2008

(30) Foreign Application Priority Data

Jan. 26, 2007  (JP)  ............... 2007-015734

(51) Int. Cl.
*F02M 25/07*  (2006.01)
*F02D 21/08*  (2006.01)

(52) U.S. Cl. ................................. 123/568.11

(58) Field of Classification Search ............ 123/568.11, 123/568.12, 568.16, 568.18, 568.21; 701/102, 701/107; 60/288, 299
See application file for complete search history.

(56) References Cited

U.S. PATENT DOCUMENTS

| | | | | |
|---|---|---|---|---|
| 6,125,801 | A * | 10/2000 | Mendler | 123/568.14 |
| 6,427,436 | B1 * | 8/2002 | Allansson et al. | 123/568.12 |
| 6,591,818 | B2 * | 7/2003 | Sasaki et al. | 123/568.12 |
| 7,155,332 | B2 * | 12/2006 | Yamada et al. | 123/568.21 |
| 7,189,374 | B1 * | 3/2007 | Hawker | 123/568.12 |
| 7,296,562 | B2 * | 11/2007 | Withrow et al. | 123/559.1 |
| 2001/0054416 | A1 * | 12/2001 | Yoshizaki et al. | 123/568.12 |
| 2006/0086080 | A1 * | 4/2006 | Katogi et al. | 60/278 |
| 2006/0225410 | A1 * | 10/2006 | Uchida et al. | 60/299 |
| 2007/0246028 | A1 * | 10/2007 | Fujita et al. | 123/568.12 |
| 2008/0178853 | A1 * | 7/2008 | Yamaoka et al. | 123/568.11 |
| 2009/0077968 | A1 * | 3/2009 | Sun | 123/568.12 |

FOREIGN PATENT DOCUMENTS

| | | |
|---|---|---|
| JP | 2000-249003 A | 9/2000 |
| JP | 2003-65162 A | 3/2003 |
| JP | 2005-140024 A | 6/2005 |
| JP | 2005-248777 A | 9/2005 |
| JP | 2006-214275 A | 8/2006 |
| JP | 2006-316706 A | 11/2006 |

* cited by examiner

*Primary Examiner*—Stephen K Cronin
*Assistant Examiner*—Arnold Castro
(74) *Attorney, Agent, or Firm*—Crowell & Moring LLP

(57) ABSTRACT

The present invention prevents an EGR sensor installed in an engine's EGR path from being soiled by soiling substances in exhaust. A catalyst is positioned upstream of the EGR sensor to purify the soiling substances in EGR gas. The status of the EGR sensor is properly controlled in accordance with the conditions of the catalyst. This ensures the EGR sensor is less likely to be affected by the soiling substances in the exhaust under any circumstances of the EGR path and allows the EGR sensor to avoid a decrease in the accuracy of EGR gas detection. An alternative configuration may be employed such that the EGR gas recirculates from the downstream side of a catalyst installed in a main exhaust path.

4 Claims, 14 Drawing Sheets

ENGINE COOLING WATER

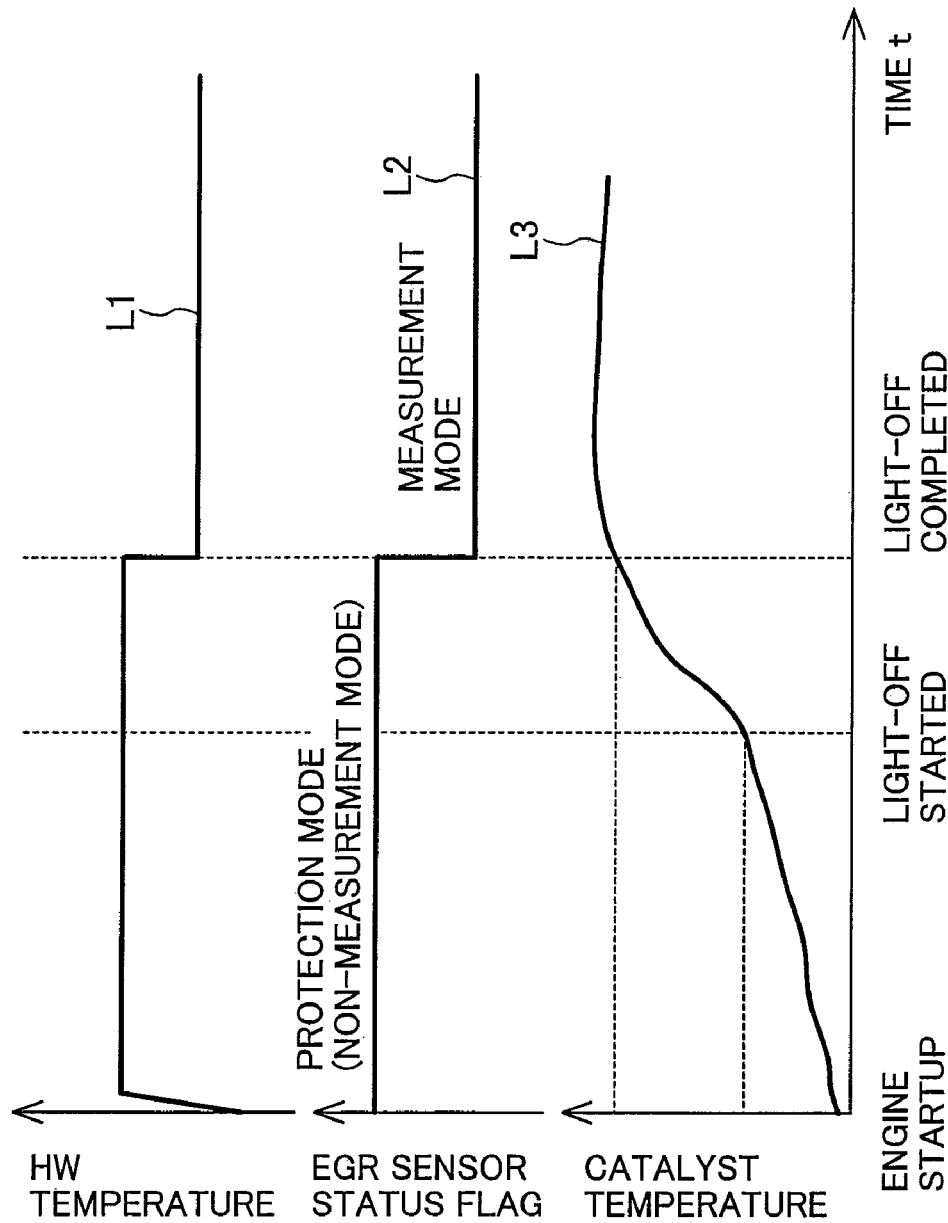

ENGINE COOLING WATER

EXHAUST GAS RECIRCULATION SYSTEM

BACKGROUND OF THE INVENTION

1. Field of the Invention

The present invention relates to an exhaust gas recirculation (EGR) system for an internal combustion engine and more particularly to a technique for furnishing an EGR path with an EGR sensor for detecting the amount of EGR.

2. Description of the Related Art

There is a known technique for precisely controlling an exhaust gas recirculation rate (EGR rate) in a cylinder of a diesel engine or other lean burn engines and reducing soot and NOx (nitrogen oxide) emissions from the engine in accordance, for instance, with engine operating conditions.

The technique for furnishing an EGR path with an EGR sensor for EGR flow rate detection for the purpose of precise detection or control of an EGR flow rate is disclosed, for instance, by JP-A-2006-214275, JP-A-2005-140024, and JP-A-2006-316706.

Further, a technique for furnishing the upstream side of an EGR cooler installed in an EGR path with a catalyst and trapping carbon or other elements in exhaust gas is disclosed, for instance, by JP-A-2003-65162, JP-A-2005-248777, and JP-A-2000-249003.

SUMMARY OF THE INVENTION

However, the techniques described above entail the following problems.

In the EGR path of an engine, soot (carbon) or other substances contained in exhaust gas soil or deteriorate pipes constituting the EGR path and devices installed in pipes and exposed to exhaust gas. For the EGR sensor installed in the EGR path in particular, if its flow rate detection section exposed to an exhaust gas flow is soiled by attached carbon or other substances, the detection accuracy of the EGR sensor, decreases. Further, if carbon or other substances are deposited in the EGR path in the case where the EGR sensor calculates a flow rate from the flow velocity of EGR gas, the inside diameter of the pipe decreases, leading to the problem that the EGR flow rate cannot be accurately calculated from the flow velocity.

The present invention has been made in view of the above circumstances. An object of the present invention is to provide a technique for preventing the EGR flow rate detection accuracy of an EGR sensor installed in an EGR path of an engine from being decreased due to a soiling substances entry into the EGR path.

Another object of the present invention is to ensure that EGR control can be steadily exercised in accordance with a sensor signal even when the EGR flow rate detection accuracy of the EGR sensor is decreased.

Still another object of the present invention is to prevent an EGR system from operating in accordance with a wrong signal of the EGR sensor.

To achieve at least one of the above objects, the present invention includes a catalyst for purifying the EGR gas or exhaust. The catalyst is positioned upstream of the EGR sensor, which detects the amount of EGR in the EGR path. While the catalyst is active, the present invention can prevent the EGR sensor from being soiled because the catalyst purifies soiling substances contained in the EGR gas or exhaust.

Another aspect of the present invention properly controls the status of the EGR system in accordance with the conditions of the catalyst. In this case, it is preferred that the EGR sensor have a flow rate measurement mode and a soilure protection mode. Specifically, while the catalyst is inactive, control is exercised to place the EGR sensor in the soilure protection mode in which the sensor protects itself against flowing soiling substances (e.g., in an output stop state or in a heating state in which a heater burns soiling substances away). While the catalyst is active, on the other hand, control is exercised to place the EGR sensor in the flow rate measurement mode. Consequently, the EGR sensor is less likely to be affected by soiling substances in the exhaust under any circumstances of the EGR path. Since this prevents the accuracy of EGR gas detection from decreasing, it is possible to prevent the deterioration of engine combustion state and exhaust.

The present invention, which has been described above, includes a catalyst that is installed upstream of the EGR sensor to purify soiling substances in the EGR gas. This allows the EGR sensor to substantially avert the influence of soiling substances in the exhaust and to avoid a decrease in the accuracy of EGR gas flow rate detection. As a result, it is possible to avoid the deterioration of engine combustion state and exhaust.

BRIEF DESCRIPTION OF THE DRAWINGS

FIG. 3 is a typical diagram illustrating EGR flow sensor status and catalyst status according to the first embodiment of the present invention.

DETAILED DESCRIPTION OF THE PREFERRED EMBODIMENTS

Embodiments of the present invention will now be described with reference to the accompanying drawings.

Figure 1:
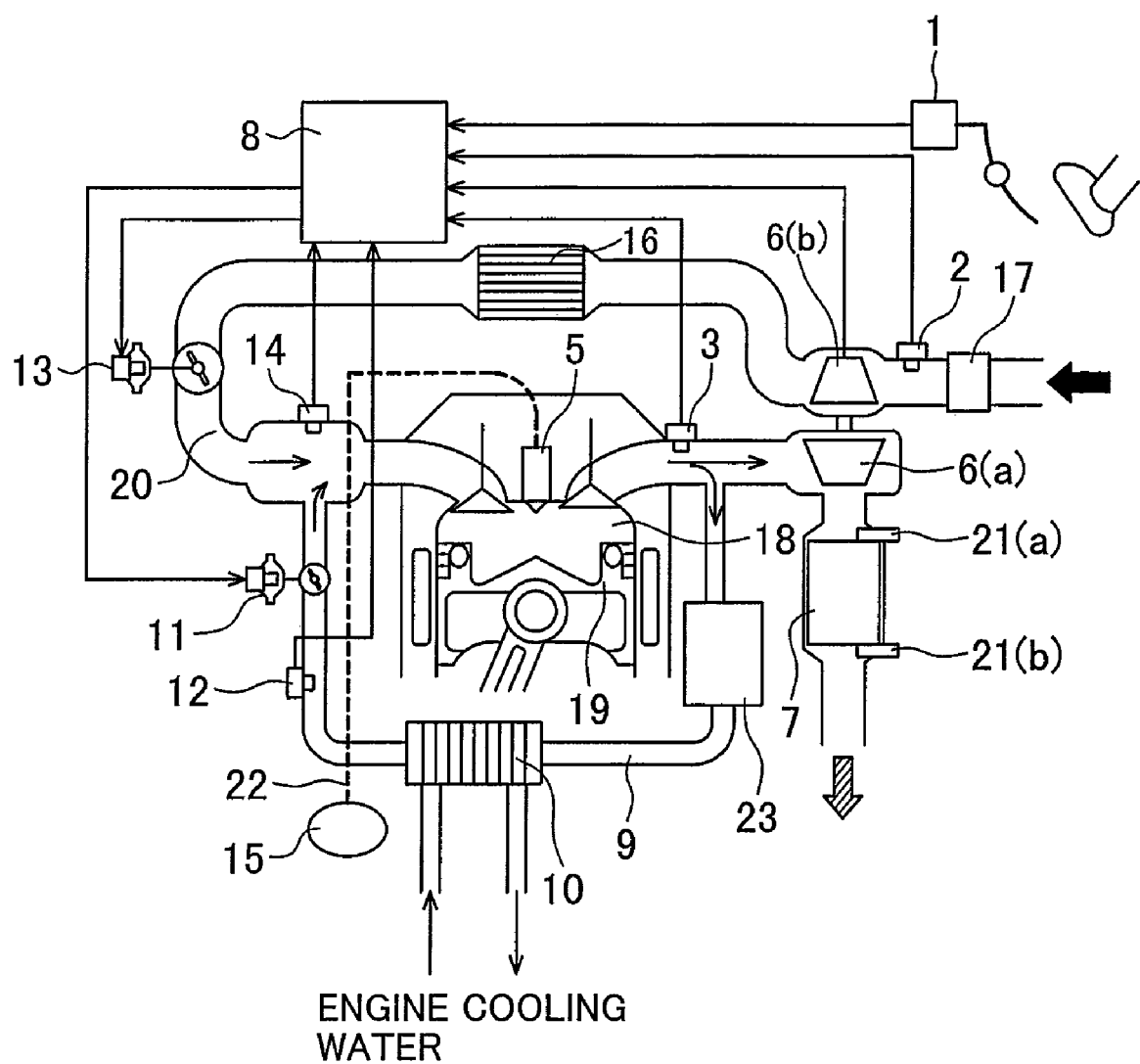
FIG. 1 shows the configuration of an engine exhaust purification device according to a first embodiment of the present invention.

FIG. 1 shows the configuration of an engine according to a first embodiment of the present invention. In FIG. 1, the reference numeral 19 denotes the engine. Positioned upstream of the engine 19 are an air cleaner 17; an air flow sensor 2; a compressor 6($b$) for a supercharger; an intercooler 16; a throttle valve 13 for intake air amount adjustment; an intake path 20; and a fuel injection valve (hereinafter referred to as the injector) 5. Intake air amount control means according to the present embodiment is composed of the compressor 6($b$), intercooler 16, and throttle valve 13, whereas intake air amount detection means is the air flow sensor 2. The injector 5 is designed to directly inject fuel into a combustion chamber 18. It is preferred that the throttle valve 13 be electronically controlled. The throttle valve 13 of the present embodiment is driven by an electric actuator. In the present embodiment, the intake path 20 is provided with an intake pressure sensor 14, which detects the pressure within the intake path 20. The detected intake pressure is used to correct the output of the air flow sensor 2 for the purpose of increasing the accuracy of intake air amount control. The exhaust pipe is provided with a $\lambda$ sensor ($O_2$ sensor) 3 for measuring the air-fuel ratio of an exhaust gas emitted from the engine, an EGR path 9 for recirculating the exhaust to the intake path 20, an EGR cooler 10 which uses engine cooling water as a refrigerant and cools recirculated exhaust gas by exchanging heat between the recirculated exhaust gas and engine cooling water, and an EGR flow control valve 11. Further, the present invention is characterized by the configuration in which the EGR path 9 is provided with an EGR flow sensor 12, which detects an EGR flow rate, and an EGR catalyst 23. The responsiveness of the EGR flow sensor 12 requires a detection period within at least one cycle of each operating condition set. Therefore, it is preferred that a hot-wire flow sensor or an electromagnetic flow sensor be used as the EGR flow sensor 12. The hot-wire flow sensor exposes a resistive element to an exhaust gas flow, sends a current to the resistive element, and measures the flow rate of exhaust gas by detecting a current change that represents the amount of heat absorbed by the exhaust gas. On the other hand, the electromagnetic flow sensor is a measuring instrument based on Faraday's law of electromagnetic induction. It measures electromotive force that is generated in exhaust gas when the exhaust gas flows in a magnetic field. More specifically, it uses an electrode, which is placed in a pipe that serves as an exhaust gas flow path, to measure a current that arises due to the generated electromotive force in accordance with Fleming's right-hand rule and flows to the exhaust gas, which serves as a conductive gas, and determines the exhaust gas flow rate from the relationship between average exhaust gas flow velocity and electromotive force. The principles of the hot-wire flow sensor will be described in detail later with reference to FIG. 2.

The EGR catalyst 23 is installed to prevent the EGR path 9 from being soiled. It is preferred that the EGR catalyst 23 be a purification catalyst based on oxidation or reduction reaction such as a three-way catalyst or an oxidation catalyst. It is also preferred that the EGR catalyst 23 be positioned upstream of the EGR cooler 10 as shown in FIG. 1.

The injector 5 injects a predetermined amount of fuel in accordance with target engine torque that is calculated, for instance, from a depression amount signal $\alpha$ of an accelerator opening sensor 1.

A fuel injection amount is corrected on an as-needed basis in accordance, for instance, with an opening signal $\theta$tp of the throttle valve 13, an opening signal $\theta$EGR of the EGR flow control valve 11, a boost pressure Ptin of the compressor 6($b$), and an output value of the $\lambda$ sensor 3. An oxygen sensor ($O_2$ sensor), $CO_2$ sensor, or other sensor capable of estimating in-cylinder oxygen concentration may be used as the $\lambda$ sensor 3.

The reference numeral 8 denotes an engine control unit (hereinafter referred to as the ECU). The ECU 8 determines, for instance, the combustion mode and control variables of the engine 19 in accordance with a user request such as an accelerator depression amount (also referred to as the accelerator opening) $\alpha$ or brake status, vehicle conditions such as vehicle velocity, and engine operating conditions such as an engine cooling water temperature and exhaust temperature. The present invention places the output processing status of the EGR flow sensor 12 in a soilure protection mode or nullifies the signal of the EGR flow sensor 12 depending on the activation status of the EGR catalyst 23, and calculates and outputs an opening control signal of the EGR flow control valve 11 in accordance with an output signal of the EGR flow sensor 12. The soilure protection mode includes a mode in which a high current flows to a sensor element of the EGR flow sensor 12 and burns soiling substances attached to the sensor element, as will hereinafter be described.

The above configuration prevents the EGR path 9, intake path 20, EGR flow control valve 11, and throttle valve 13 from being soiled by PM (particulate matter) or other substances emitted from the engine 19, and enhances the durability of the engine.

Figure 2A:
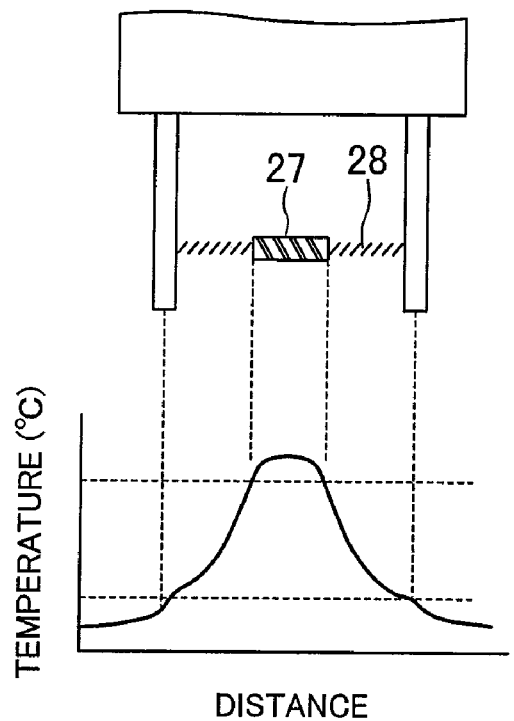
FIGS. 2A and 2B are conceptual diagrams illustrating an EGR sensor measurement method (hot wire type) according to the first embodiment of the present invention.
Figure 2B:
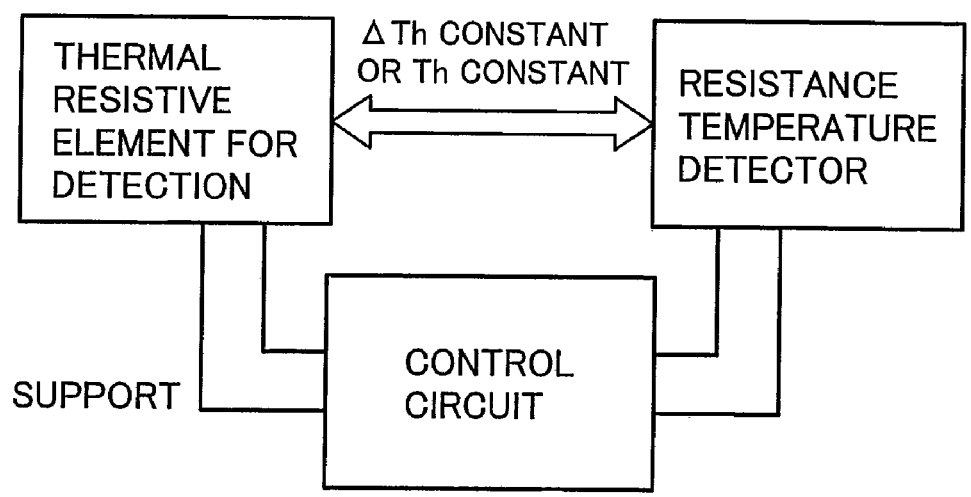

As a representative example of measurement principles of the EGR sensor according to the present invention, principles of the hot-wire flow sensor will now be described with reference to FIGS. 2A and 2B. This sensor uses two different thermal resistive elements. One of them is a resistance temperature detector, which detects the temperature of a gas that is to be measured. The other is set at a relatively high temperature (operating temperature: approximately 200 to 300° C.) and controlled such that the temperature difference between the two thermal resistive elements remains unchanged at all times. The employed configuration includes a hot wire 27 and a lead wire 28 as shown in FIG. 2A. As shown in FIG. 2B, a control circuit controls the temperatures of both of them, and the current control state of that particular time is used to detect the amount of intake gas. This thermal configuration excels in output responsiveness to a change in the gas flow rate. Therefore, most of current automotive intake flow meters employ this thermal flow meter.

Meanwhile, output characteristics deterioration due to soilure is a serious problem for a flow meter no matter whether it is used as an intake flow meter or exhaust flow meter. In particular, if PM or other soiling substances are attached to the hot wire 27, the output from the sensor significantly changes so that the amount of gas cannot be detected accurately. To avoid such soilure, the EGR flow sensor 12 according to the present invention employs the soilure protection mode to provide control so that the temperature of the hot wire 27 can be temporarily raised to burn the PM. This makes it possible not only to burn PM and other soiling substances but also to prevent soiling substances being newly attached to the hot wire 27. In this instance, it is preferred that the temperature of the hot wire 27 be raised to 600° C. or higher. However, such a temperature varies depending on the engine employed.

When such control as in the soilure protection mode is exercised as described above, the output of the EGR flow sensor 12 temporarily becomes unstable during the soilure protection mode. Therefore, the use of the soilure protection mode is not appropriate during the gas flow rate detection. Further, since it is difficult to prevent the attachment of all soiling substances, it is basically necessary to purify the soiling substances to the extent possible while the EGR catalyst 23 is active.

FIG. 3 is a typical diagram illustrating a situation where the soilure protection mode of the EGR sensor is used in accordance with the first embodiment of the present invention. As mentioned earlier, if soiling substances are attached onto the hot wire 27 of the EGR flow sensor 12, it is necessary to temporarily raise the temperature of the hot wire 27 to a level at which the PM burns. Therefore, the engine according to the present invention exercises control as shown in FIG. 3 to prevent the EGR flow sensor 12 from being soiled and deteriorated.

Line L1 in the diagram represents the surface temperature of the hot wire 27. Line L2 represents a status flag of the EGR flow sensor 12 to be judged in the ECU 8. Line L3 represents the temperature of the EGR catalyst 23. First of all, when the engine starts up, soiling substances in an engine exhaust cannot be purified because the EGR catalyst 23 is low in temperature and inactive (light-off is not achieved). Therefore, the EGR flow sensor 12 enters the soilure protection mode to raise the temperature of the hot wire 27 preferably to 600° C. or higher as indicated by lines L1 and L2. This makes it possible to burn soiling substances attached to the surface of the hot wire 27 and to prevent the attachment of soiling substances during the soilure protection mode. Subsequently, after the engine operates for a certain period of time, the temperature of the EGR catalyst 23 rises as indicated by line L3 to start light-off. During this stage, purification is not sufficiently performed by the EGR catalyst 23. Therefore, the EGR flow sensor 12 still remains in the soilure protection mode. After light-off is subsequently completed by the EGR catalyst 23, exhaust purification becomes achievable. Accordingly, the EGR flow sensor 12 enters a measurement mode as indicated by line L2 so that the surface temperature of the hot wire 27 can be changed as appropriate for measurement. More specifically, the ECU exercises control such that the hot wire 27 enters a high-current conduction state and functions as a heater while the EGR catalyst 23 is inactive and enters a small-current conduction state and functions as a sensor while the EGR catalyst 23 is active.

Figure 4:
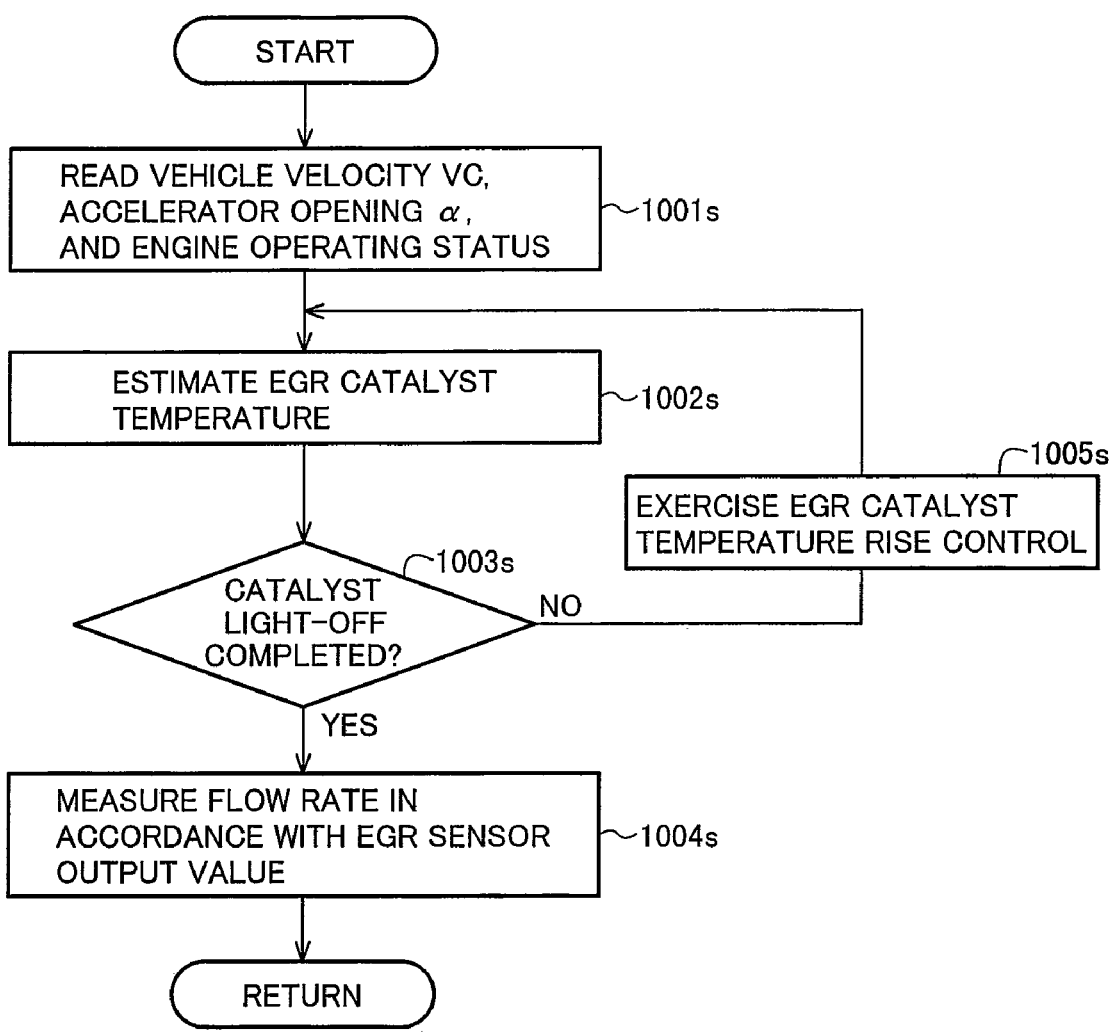
FIG. 4 is a typical flowchart illustrating EGR flow sensor control according to the first embodiment of the present invention.

FIG. 4 is a temperature control flowchart concerning the EGR catalyst 23, explaining FIG. 3 in more detail. First of all, block 1001s is performed. In block 1001s, the vehicle velocity Vc, accelerator opening α, engine operating status, and other conditions of a vehicle in which the engine 19 is mounted are read. Next, block 1002s is performed to estimate the current temperature of the EGR catalyst 23. The procedure then proceeds to block 1003s. If the judgment result obtained in block 1003s indicates that catalyst light-off is completed, block 1004s is performed to exit the protection mode of the EGR flow sensor 12, start to detect the gas flow rate, and use the detection results for engine control. If, on the other hand, light-off is not completed, it means that the temperature of the EGR catalyst 23 is yet to be raised high enough to purify soiling substances. Accordingly, the procedure proceeds to block 1005s. In block 1005s, control is continuously exercised to raise the temperature until the judgment result indicates that a light-off temperature is reached.

The use of the above flow makes it possible to properly prevent the EGR flow sensor 12 from becoming soiled and deteriorating and to detect an EGR gas flow rate accurately.

Figure 5:
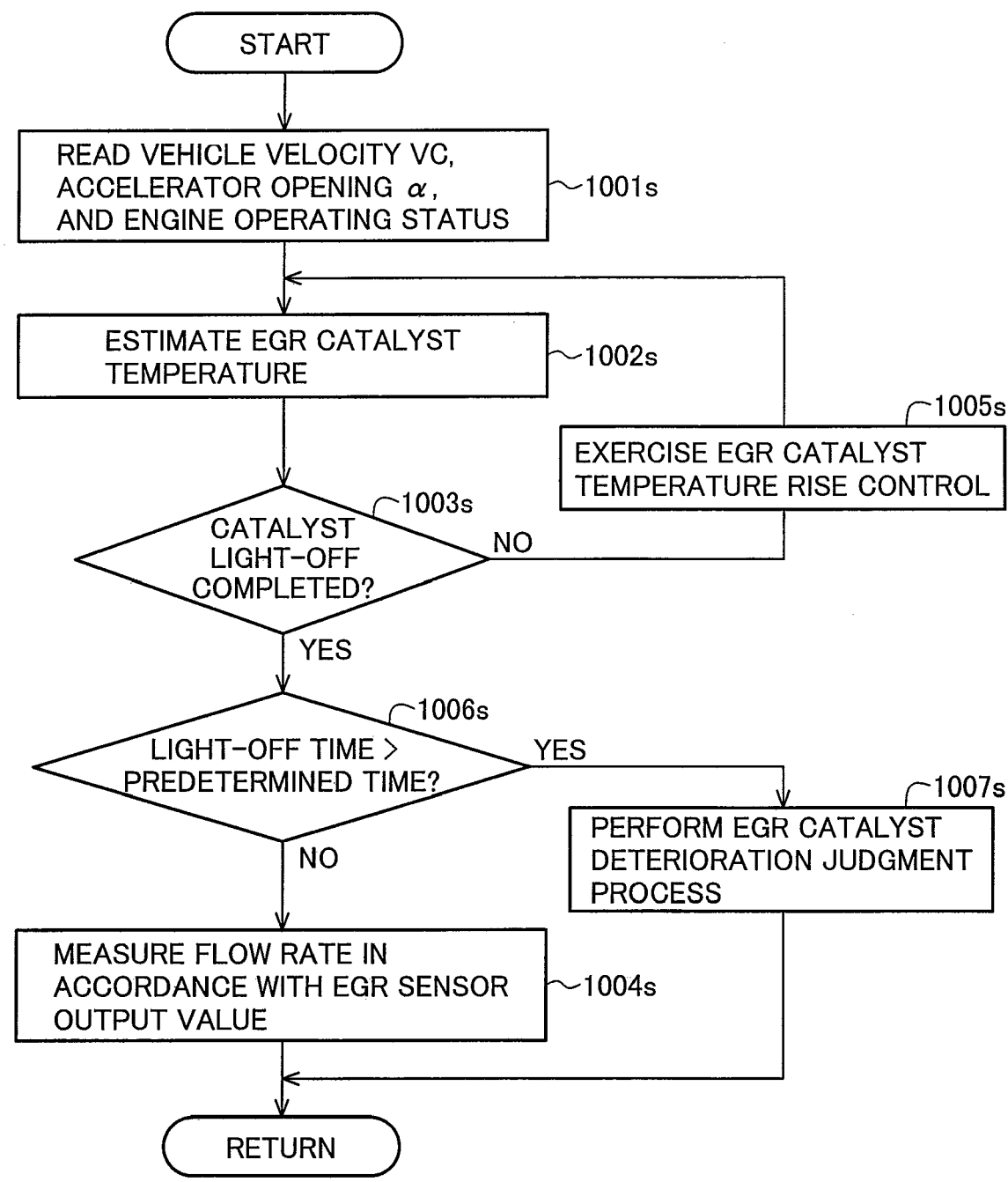
FIG. 5 is a typical flowchart illustrating the control of the EGR flow sensor and catalyst according to the first embodiment of the present invention.

FIG. 5 is a flowchart illustrating a method of judging whether the EGR catalyst 23 is deteriorated. Since the deterioration of the EGR catalyst 23 leads to soilure of the EGR path 9 and other devices, it is necessary to accurately judge whether the EGR catalyst 23 is deteriorated.

The control of the EGR catalyst 23 in FIG. 5 is the same as that in FIG. 4. However, as shown in FIG. 5, if the judgment result obtained in block 1003s indicates that the light-off of the EGR catalyst 23 is completed, the ECU 8 detects the time required from the engine startup to the completion of the light-off of the EGR catalyst 23. Block 1006s is then performed to judge whether the detected time is longer than a predetermined value. If the detected time is not longer than the predetermined value, block 1004s is performed to exit the protection mode of the EGR flow sensor 12, start to detect the gas flow rate, and use the detection results for engine control. If, on the other hand, the detected time is longer than the predetermined value, it is highly probable that it took a longer time for the EGR catalyst 23 to complete the light-off, that is, the EGR catalyst 23 has deteriorated. This judgment result is stored in the ECU 8, reported, for instance, to the user as a warning, or otherwise processed as prescribed by the vehicle or engine. If at least the function to prevent soilure of the EGR flow sensor 12 remains unaffected, the engine operation can be continued. Such a deterioration judgment as formulated above allows the EGR flow sensor 12 to avoid soiling substances with the conditions of EGR catalyst 23 being considered.

A second embodiment of the present invention will now be described. The second embodiment uses a DPF (diesel particulate filter) or other similar adsorption or occlusion catalyst as the EGR catalyst.

Figure 6:
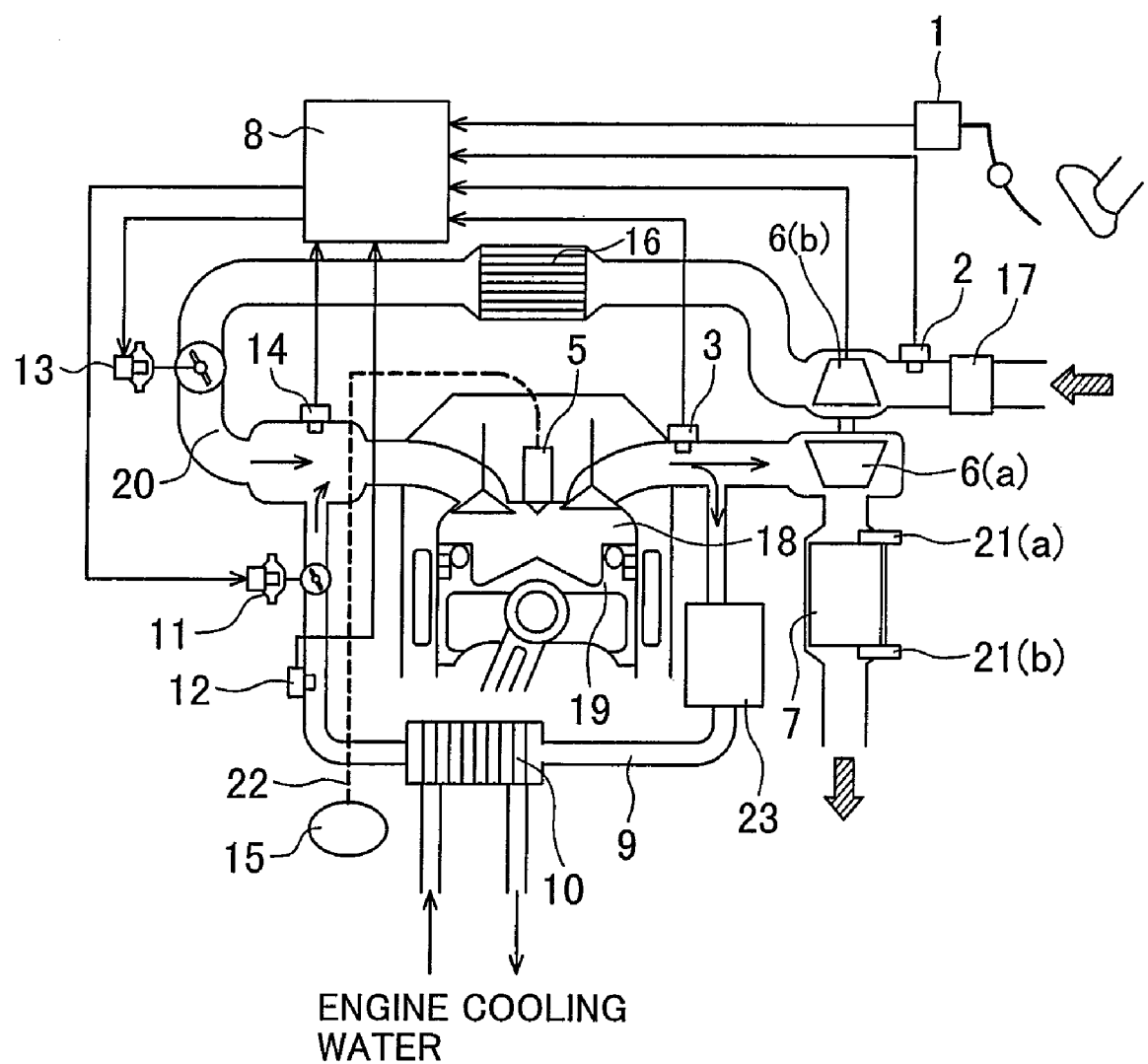
FIG. 6 shows the configuration of the engine exhaust purification device according to a second embodiment of the present invention.

FIG. 6 shows the configuration of an engine according to the second embodiment of the present invention. Although the basic configuration of the second embodiment is the same as that of the first embodiment (FIG. 1), the second embodiment uses a DPF or other similar adsorption or occlusion catalyst as the EGR catalyst 24, as described above. This EGR catalyst 24 does not have a so-called "light-off" characteristic but can adsorb (occlude) a predetermined amount of soiling substances even at a low temperature. Further, as regards the PM and the like, the catalyst configuration according to the second embodiment is at an advantage in that it can provide higher purification efficiency than the catalyst configuration according to the first embodiment. Therefore, it is possible to prevent the EGR flow sensor 12 and EGR path 9 from becoming soiled even in an engine which has many conditions for relatively-low-temperature operations. A control method for the EGR flow sensor 12 according to the second embodiment will now be described.

Figure 7:
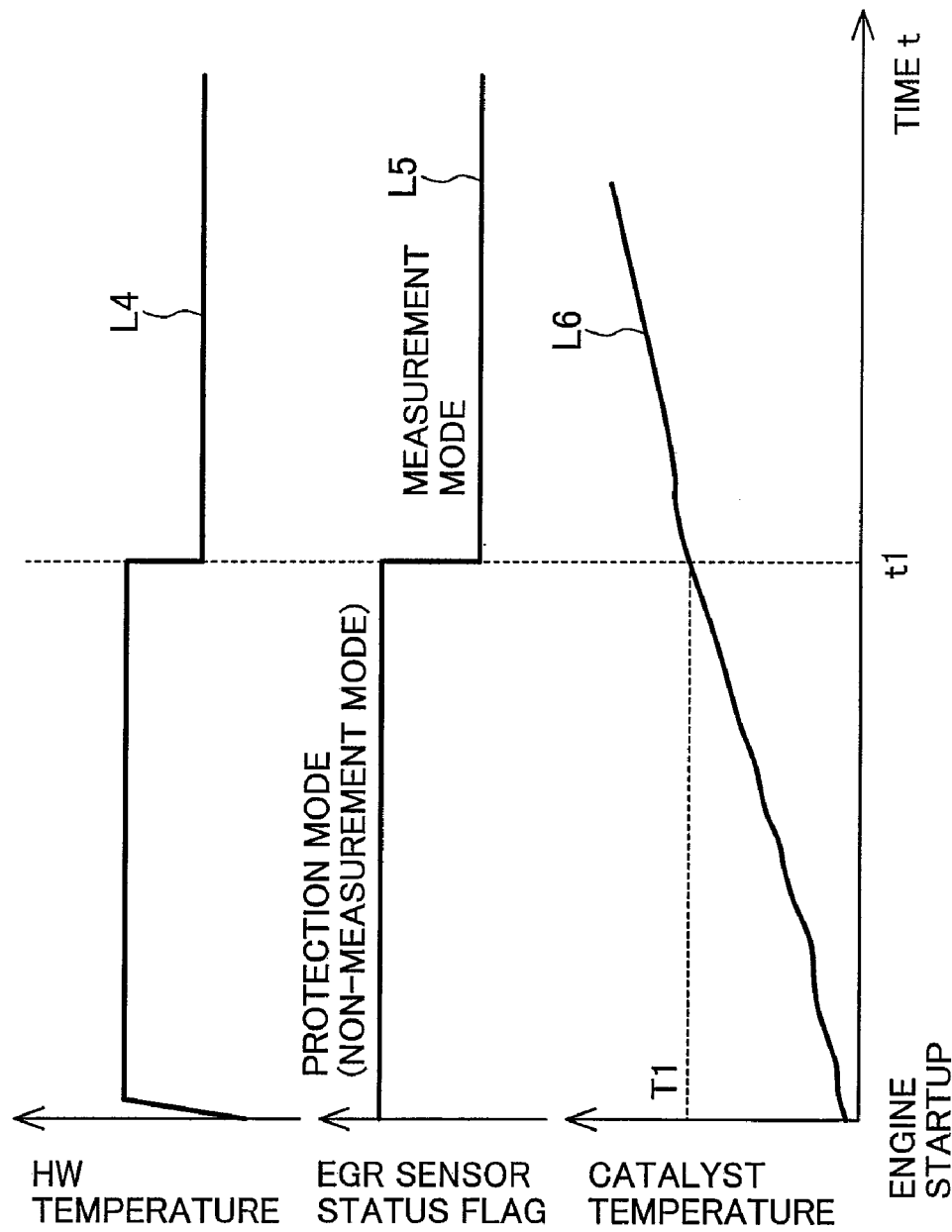
FIG. 7 is a typical diagram illustrating EGR flow sensor status and catalyst status according to the second embodiment of the present invention.

FIG. 7 is a typical diagram illustrating a situation where the protection mode of the EGR sensor is used in accordance with the second embodiment. Line L4 in the diagram represents the surface temperature of the hot wire 27. Line L5 represents a status flag of the EGR flow sensor 12 to be judged in the ECU 8. Line L6 represents the temperature of the EGR catalyst 24. In the configuration according to the present embodiment, the EGR catalyst 24 is operative and adsorbs (occludes) soiling substances and the like even right after the engine starts up. However, when the temperature is low, the soiling substances in the engine exhaust cannot be properly purified as in the case of the first embodiment because the purification efficiency (adsorption efficiency) is low. Therefore, the EGR flow sensor 12 enters the soilure protection mode to raise the temperature of the hot wire 27 preferably to 600° C. or higher as indicated by lines L4 and L5. This makes it possible to burn soiling substances attached to the surface of the hot wire 27 and to avoid the attachment of soiling substances during the soilure protection mode. It is preferred that the EGR flow sensor 12 refrain from performing a flow rate detection operation during this interval. Subsequently, after the engine operates for a certain period of time, the temperature of the EGR catalyst 24 rises as indicated by line L6 and reaches catalyst temperature T1 at time t1. At temperature T1, the purification efficiency of the EGR catalyst 24 exceeds a predetermined value. Therefore, the EGR flow sensor 12 enters the measurement mode as indicated by line L5, and the surface temperature of the hot wire 27 is changed as appropriate for measurement.

Figure 8:
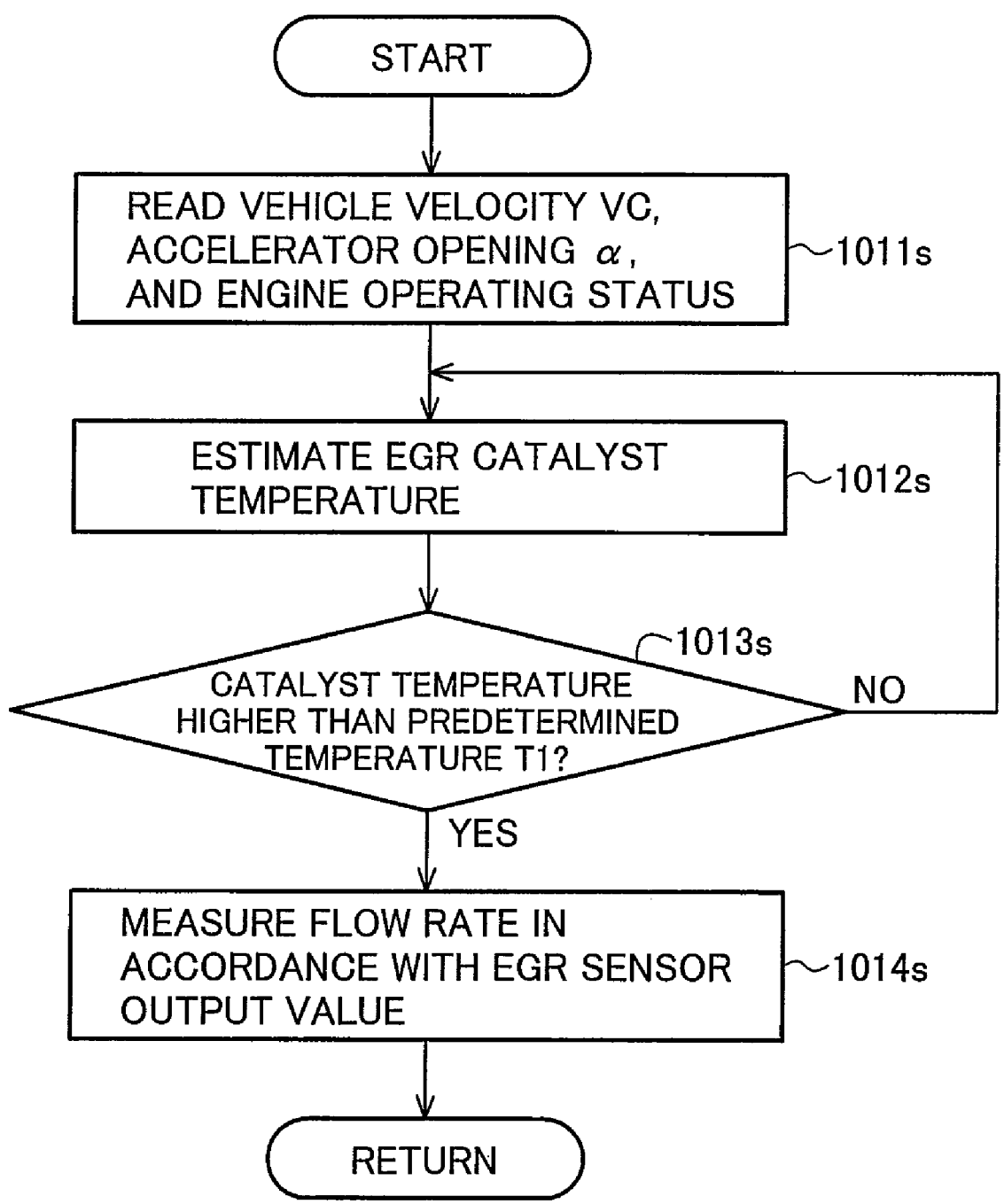
FIG. 8 is a typical flowchart illustrating the EGR flow sensor control according to the second embodiment of the present invention.

FIG. 8 is a temperature control flowchart concerning the EGR catalyst 24, explaining FIG. 7 in more detail. The basic flow is the same as that of the first embodiment (FIG. 4). However, a different criterion is used in block 1013s. If the judgment result obtained in block 1013s indicates that a value obtained in block 1012s exceeds a predetermined value, it means that the purification efficiency of the EGR catalyst 24 exceeds the predetermined value. Accordingly, the EGR flow sensor 12 exits the protection mode, starts to detect the gas flow rate (block 1014s), and uses the detection results for engine control. If, on the other hand, the value obtained in block 1012s does not exceed the predetermined value, the judgment process is repeatedly performed until the predetermined value is reached. In other words, the use of the above flow makes it possible to properly prevent the EGR flow sensor 12 from becoming soiled and deteriorating and to accurately detect an EGR gas flow rate no matter whether an adsorption (occlusion) catalyst is employed as the EGR catalyst 24.

Figure 9:
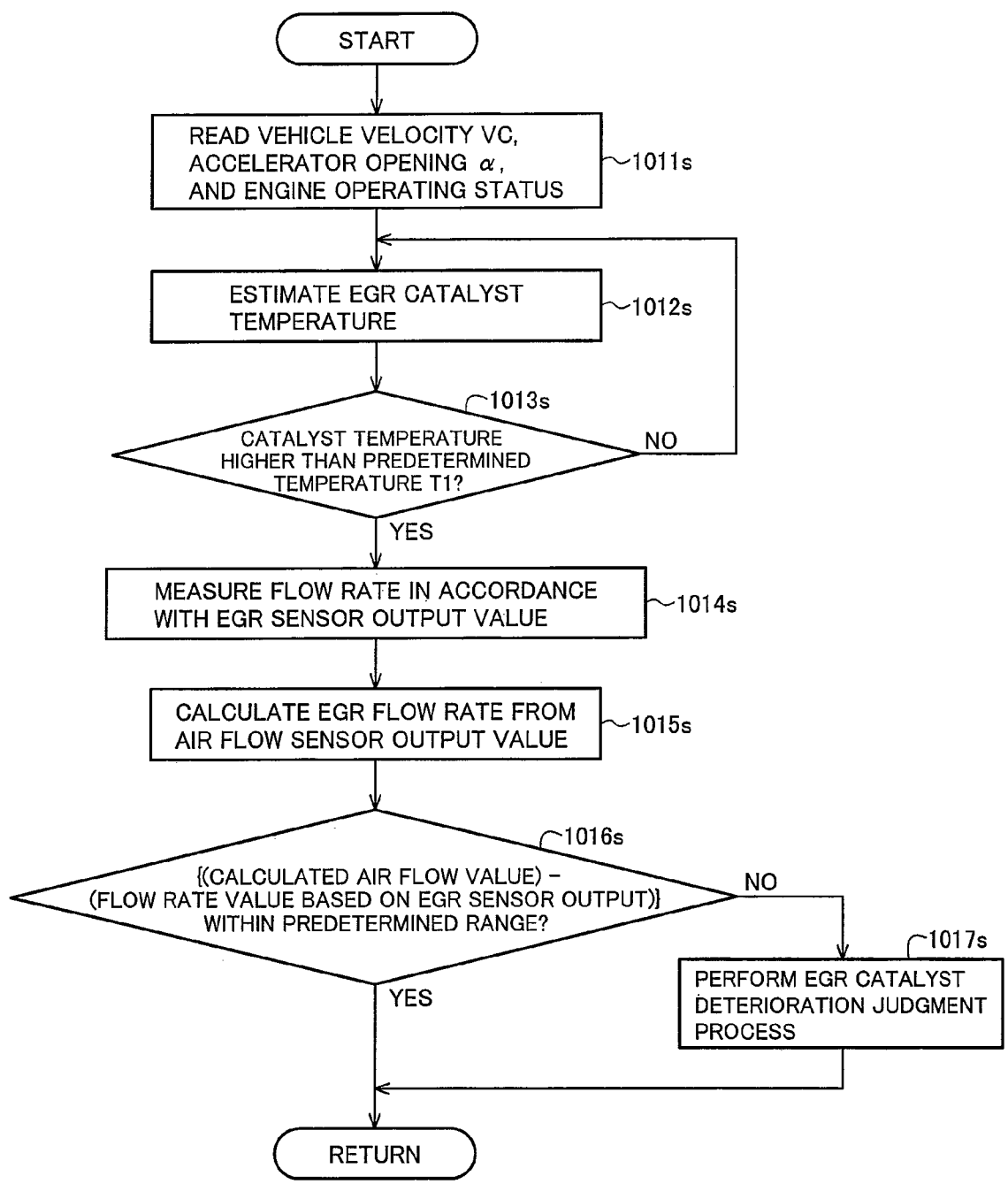
FIG. 9 is a typical flowchart illustrating the control of the EGR flow sensor and catalyst according to the second embodiment of the present invention.

FIG. 9 is a flowchart illustrating a method of judging whether the EGR catalyst 24 is deteriorated. If the adsorption (occlusion) EGR catalyst 24 is deteriorated, the EGR path 9, devices, and other parts may become soiled. In addition, a pressure drop may occur in the EGR path 9. Since these phenomena may make it impossible to exercise an accurate EGR flow rate control, it is necessary to accurately judge whether the EGR catalyst 24 is deteriorated.

If the judgment result obtained in block 1013s indicates that the temperature of the EGR catalyst 24 is higher than a predetermined value, the EGR flow sensor 12 exits the protection mode, starts to detect the gas flow rate (block 1014s), and uses the detection results for engine control, as indicated in FIG. 9. In this instance, an output value generated from the air flow sensor 2 is simultaneously used to calculate the EGR flow rate (block 1015s). Block 1016s is then performed to judge whether the obtained difference between the output value from the air flow sensor 2 and the calculated EGR flow rate is within a predetermined range. While the engine is performing a steady operation, even a calculated EGR flow rate value based on the air flow sensor output value has an error rate of not greater than 3% or so. It theoretically means that the calculation result obtained in block 1016s is infinitely close to zero. However, the output values of the EGR sensor are more subject to the effects of soilure or deterioration than those of the air flow sensor 2 due to the environment of the EGR path 9. In other words, if the calculation result obtained in block 1016s is not within the predetermined range, it means that the EGR flow sensor 12 is considerably soiled and that the EGR catalyst 24 is not properly functioning. Thus, the deterioration of the EGR catalyst 24 can be diagnosed in accordance with the calculation result (block 1017s) to perform a necessary process. It is needless to say that the present embodiment can exercise control to place the EGR flow sensor 12 again in the protection mode in accordance with the calculation result and to avoid soilure.

Figure 10:
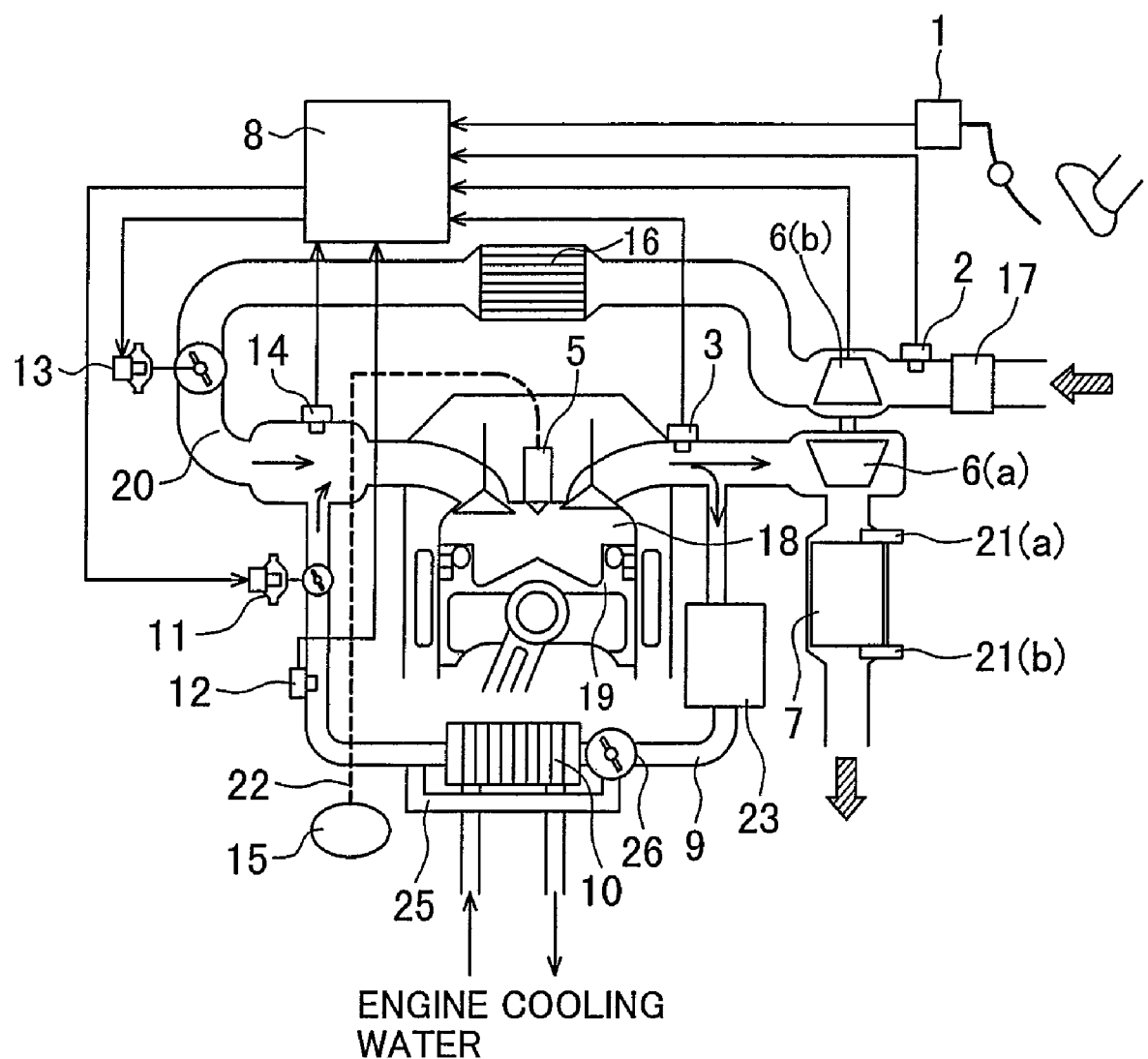
FIG. 10 shows the configuration of the engine exhaust purification device according to a third embodiment of the present invention.

FIG. 10 shows the configuration of an engine according to a third embodiment of the present invention. Although the basic configuration of the third embodiment is the same as those of the first and second embodiments (FIGS. 1 and 6), the third embodiment is configured such that a bypass flow path 25 is positioned in the EGR flow path 9 before and after the EGR cooler 10, and a control valve 26 is positioned in the EGR flow path 9 before the EGR cooler 10. Such a configuration is employed so that a predetermined amount of the EGR gas of a relatively high temperature, which does not pass through the EGR cooler 10, can be returned to the intake path at a cold startup. This raises the gas temperature at the combustion chamber 18 to facilitate fuel vaporization and to reduce the exhaust of PM and the like. Even when this configuration is used, the EGR flow sensor 12 can accurately detect the EGR flow rate in accordance with engine operating conditions and control variables provided by the control valve 26. In this instance, it is preferred that a three-way catalyst, an oxidation catalyst, or other purification catalysts based on oxidation or reduction reaction be used as the EGR catalyst 23. However, the use of a DPF or other similar adsorption or occlusion catalysts causes no particular problem.

Figure 11:
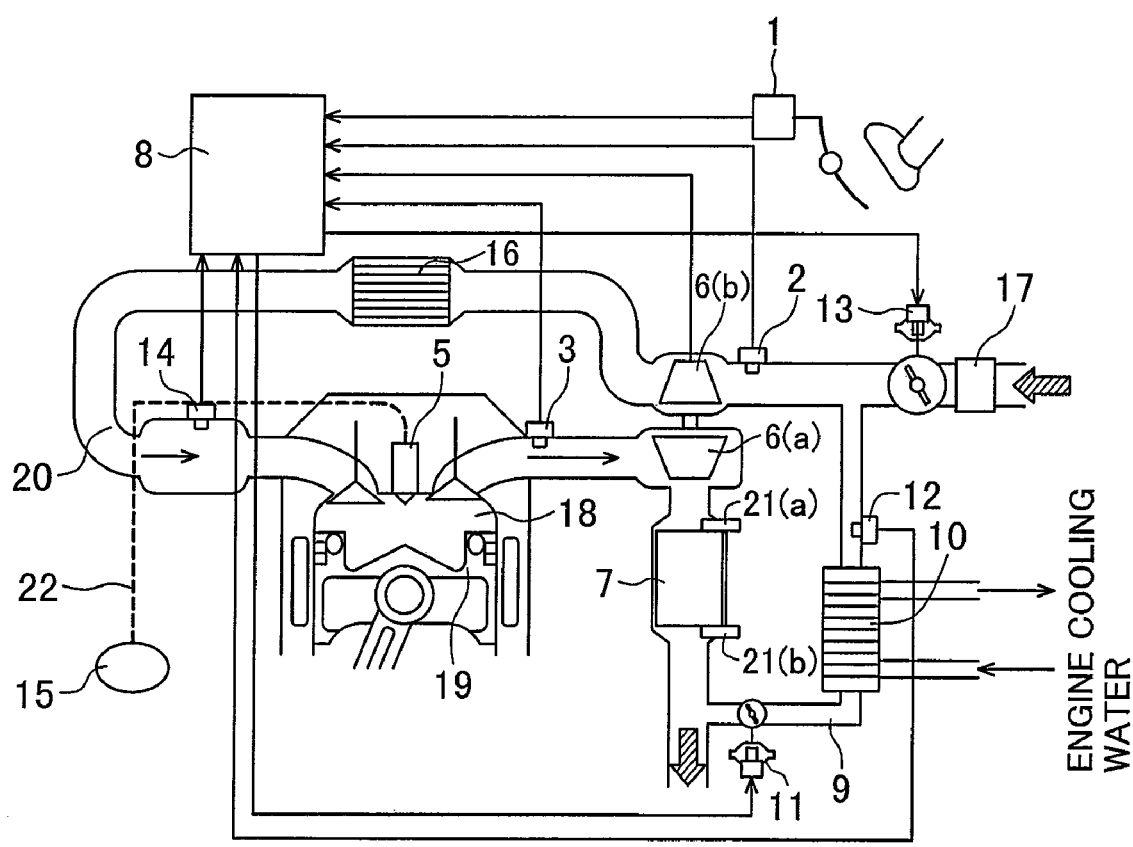
FIG. 11 shows the configuration of the engine exhaust purification device according to a fourth embodiment of the present invention.

FIG. 11 shows the configuration of an engine according to a fourth embodiment of the present invention. The fourth embodiment differs from the foregoing embodiments in the engine configuration. More specifically, the EGR path 9 is positioned as a path that connects the rear of an exhaust catalyst 7 to the compressor 6(b) for the supercharger. Further, the throttle valve 13, which adjusts the intake air amount, is positioned immediately downstream of the air cleaner 17 and upstream of a connecting hole on the intake side of the EGR path 9. Since this configuration enables the exhaust catalyst 7 to function as an EGR catalyst, the EGR catalyst is unnecessary. Consequently, the costs of the system can be reduced. It is assumed that the exhaust catalyst 7 is a combination of a three-way catalyst, an oxidation catalyst, or other purification catalysts based on oxidation or reduction reaction and a DPF, NOx catalyst, or other adsorption or occlusion catalysts. However, the use of either the above purification catalyst or the above adsorption or occlusion catalyst and the use of a differently configured catalyst are also covered by the scope of the present invention. The following description assumes that the exhaust catalyst 7 according to the present embodiment is a combination of a purification catalyst (e.g., oxidation catalyst) and an adsorption catalyst (e.g., DPF). Further, since the air flow sensor 2 and EGR flow sensor 12 are virtually equidistant from the engine combustion chamber 18, the air flow sensor 2 may also be excluded from the system. However, this matter will not be described in detail because it is not intended to be included in the scope of the present invention.

Figure 12:
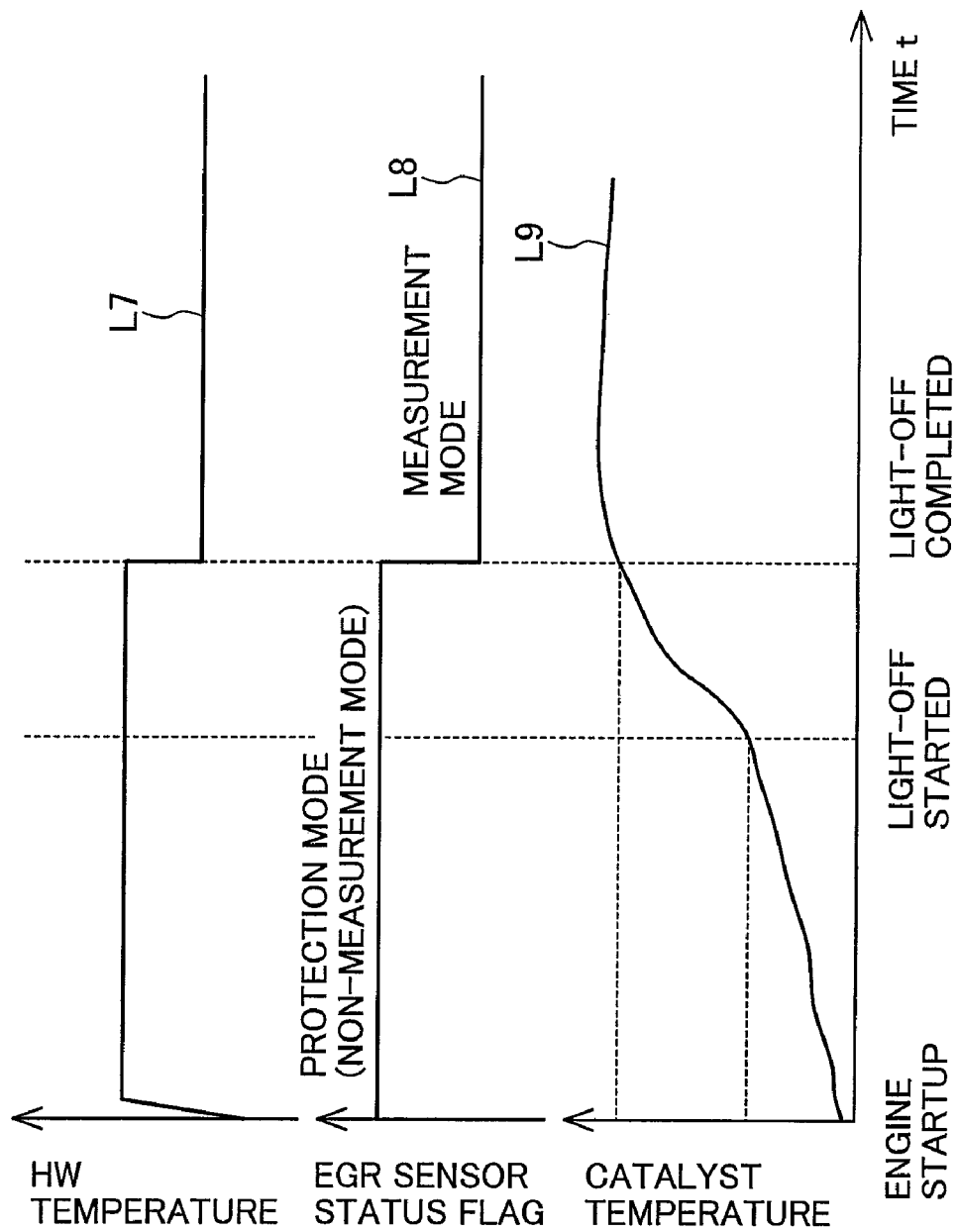
FIG. 12 is a typical diagram illustrating EGR flow sensor status and catalyst status according to the fourth embodiment of the present invention.

FIG. 12 is a typical diagram illustrating a situation where the protection mode of the EGR sensor is used in accordance with the fourth embodiment. Line L7 in the diagram represents the surface temperature of the hot wire 27. Line L8 represents a status flag of the EGR flow sensor 12, which is to be judged by the ECU 8. Line L9 represents the temperature of the EGR catalyst 23. First of all, when the engine starts up, the temperature of the exhaust catalyst 7 is low such that the purification catalyst is inactive (light-off is not completed). Thus, soiling substances in the engine exhaust cannot be purified. Such being the case, the EGR flow sensor 12 enters the soilure protection mode to raise the temperature of the hot wire 27 preferably to 600° C. or higher, as indicated by lines L7 and L8. This makes it possible to burn soiling substances attached to the surface of the hot wire 27 and to avoid the attachment of soiling substances during the soilure protection mode. Subsequently, after the engine operates for a certain period of time, the temperature of the EGR catalyst 23 rises as indicated by line L9 to start light-off. During this stage, purification is not sufficiently performed by the EGR catalyst 23. Therefore, the EGR flow sensor 12 still remains in the protection mode. After the light-off of the EGR catalyst 23 is subsequently completed, exhaust purification becomes achievable. Accordingly, the EGR flow sensor 12 enters the measurement mode as indicated by line L8, and the surface temperature of the hot wire 27 is changed as appropriate for measurement.

In this state, the adsorption catalyst in the combined catalyst is more or less capable of exercising its adsorption function even when the temperature is low, as shown in FIG. 7. Therefore, the purification characteristic of the exhaust catalyst 7 that prevails at a low temperature is governed by the characteristic of the purification catalyst in the combined catalyst. Consequently, it is possible to properly prevent the EGR flow sensor 12 from becoming soiled and deteriorating when control is exercised as described above.

In the present embodiment, a certain condition of the exhaust catalyst 7 may incur the soilure and deterioration of EGR flow sensor 12 and affect EGR flow rate detection. It is therefore necessary to judge whether the exhaust catalyst 7 is deteriorated, as in the case of the first and second embodiments.

Figure 13:
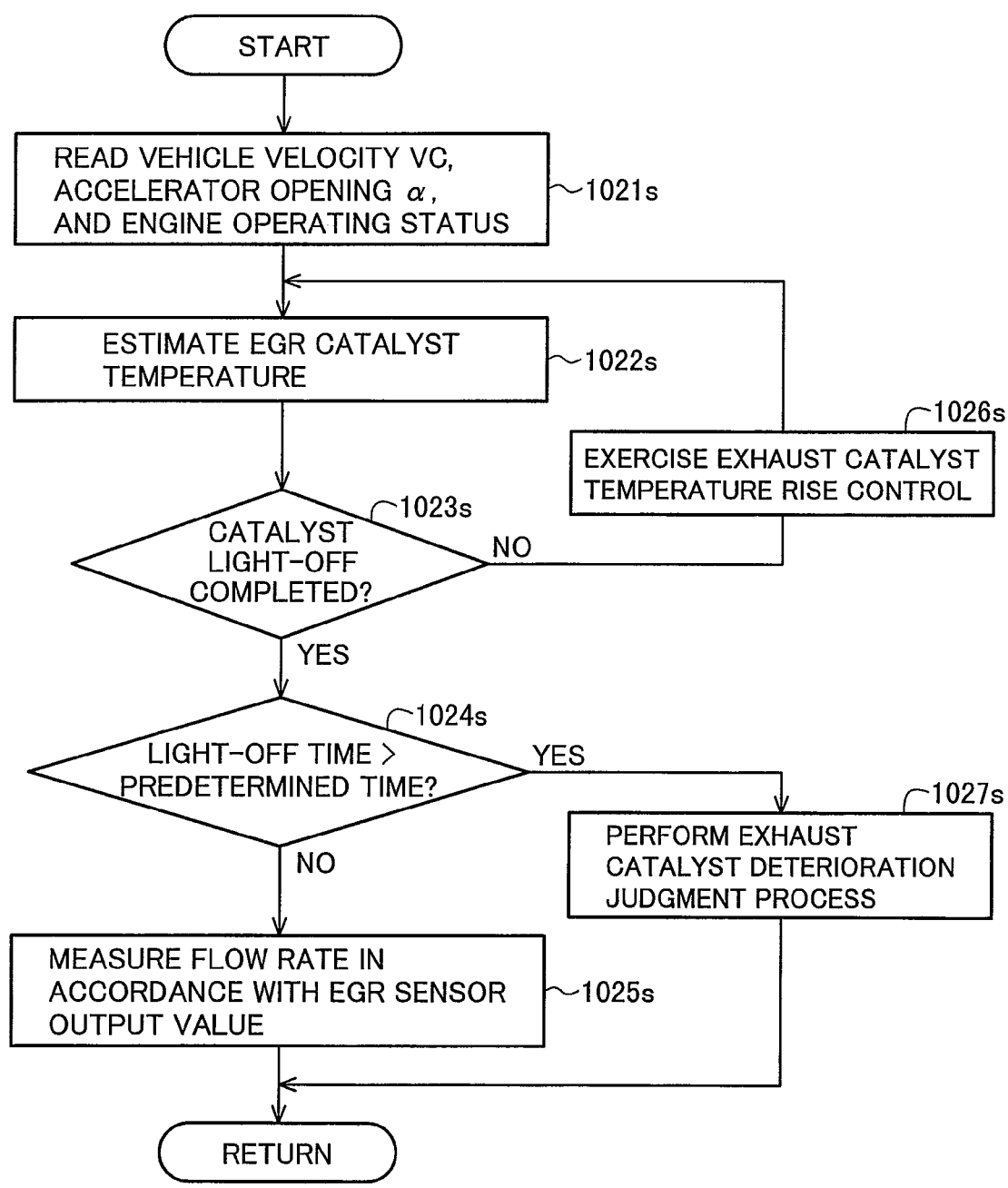
FIG. 13 is a typical flowchart illustrating the EGR flow sensor control according to the fourth embodiment of the present invention.
Figure 14:
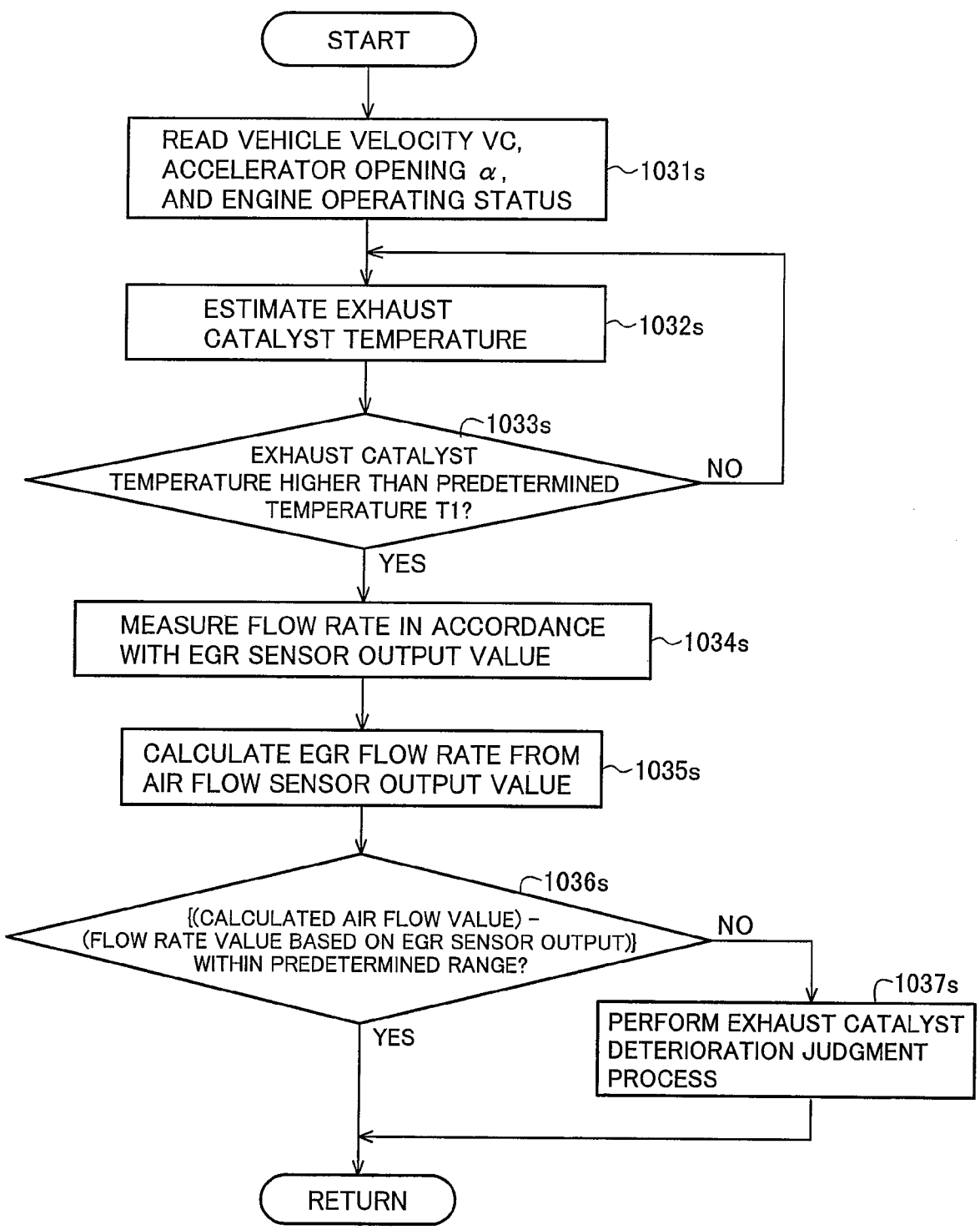
FIG. 14 is a typical control flowchart illustrating the control of the EGR flow sensor and catalyst according to the fourth embodiment of the present invention.

FIGS. 13 and 14 are flowcharts illustrating how to judge whether the exhaust catalyst 7 is deteriorated. These figures are deterioration diagnosis flowcharts for the purification catalyst and adsorption catalyst, respectively. These flowcharts are combined to diagnose the exhaust catalyst 7.

FIG. 13 shows steps that are followed to judge whether the purification catalyst in the combined catalyst is deteriorated. The steps indicated in this figure are basically the same as the diagnosis steps for the EGR catalyst 23, which are shown in FIG. 5. First of all, block 1021s is performed to read the vehicle velocity Vc, accelerator opening α, engine operating status, and other conditions of a vehicle in which the engine 19 is mounted. Block 1022s is then performed to estimate the current temperature of the exhaust catalyst 7. The procedure proceeds to block 1023s to judge whether light-off is completed. If light-off is not completed, it means that the temperature of the exhaust catalyst 7 is yet to be raised high enough to purify soiling substances. Accordingly, the procedure proceeds to block 1026s. In block 1026s, temperature rise control is continuously exercised until the judgment result indicates that a light-off temperature is reached. If the judgment result obtained in block 1023s indicates that the light-off of the exhaust catalyst 7 is completed, the ECU 8 detects the time required from the engine startup to the completion of the light-off of the exhaust catalyst 7. Block 1024s is then performed to judge whether the detected time is longer than a predetermined value. If the detected time is not longer than the predetermined value, block 1025s is performed to exit the protection mode of the EGR flow sensor 12, start to detect the gas flow rate, and use the detection results for engine control. If, on the other hand, the detected time is longer than the predetermined value, it is highly probable that it took a longer time for the exhaust catalyst 7 to complete the light-off, that is, the catalyst has deteriorated. This judgment result is stored in the ECU 8, reported, for instance, to the user as a warning, or otherwise processed as prescribed by the vehicle or engine (block 1027s).

FIG. 14 shows steps that are followed to judge whether the adsorption catalyst in the combined catalyst is deteriorated. Blocks 1031s and 1032s are performed to read the vehicle velocity Vc, accelerator opening α, engine operating status, and other conditions of a vehicle in which the engine 19 is mounted, and to estimate the current temperature of the exhaust catalyst 7. If the judgment result obtained in block 1033s indicates that the temperature of the exhaust catalyst 7 is higher than a predetermined value, it can be concluded that the adsorption efficiency of the adsorption catalyst in the exhaust catalyst 7 is higher than a predetermined value. Accordingly, block 1034s is performed to exit the protection mode of the EGR flow sensor 12, start to detect the gas flow rate, and use the detection results for engine control. If, on the other hand, the temperature is not higher than the predetermined value, the judgment process is repeatedly performed until the predetermined temperature is reached. In this instance, block 1035s is simultaneously performed to calculate the EGR flow rate from an output value generated from the air flow sensor 2. Block 1036s is then performed to judge whether the obtained difference between the output value from the air flow sensor 2 and the calculated EGR flow rate is within a predetermined range. While the engine is performing a steady operation, even a calculated EGR flow rate value based on the air flow sensor output value has an error rate of not greater than 3% or so. It theoretically means that the calculation result obtained in block 1036s is infinitely close to zero. However, the output values of the EGR sensor are more subject to the effects of soilure or deterioration than those of the air flow sensor 2 due to the environment of the EGR path 9. In other words, if the calculation result obtained in block 1036s is not within the predetermined range, it means that the EGR flow sensor 12 is considerably soiled and that the exhaust catalyst 7 is not properly functioning. Thus, the deterioration of the adsorption catalyst in the exhaust catalyst 7 is diagnosed in accordance with the calculation result (block 1037s) to perform a necessary process. It is needless to say that the present embodiment can exercise control to place the EGR flow sensor 12 again in the protection mode in accordance with the calculation result and to avoid soilure.

Such a deterioration judgment as described above with reference to FIGS. 13 and 14 allows the EGR flow sensor 12 to avoid soiling substances with the conditions of EGR catalyst 23 being considered.

All the four embodiments described above assume that the EGR catalyst, EGR flow sensor, and EGR cooler are separately positioned. However, it is obvious that the present invention may employ an alternative configuration in which the above three components are constructed integrally. Further, the EGR flow sensor need not necessarily be placed within the EGR path: it may be positioned at a place where an exhaust flow rate or the like can be detected.

Further, it goes without saying that the present invention may employ not only a hot-wire detection method but also an ultrasonic or other detection methods as a sensor's detection method as far as it requires the same control process as that of the present invention.

Each embodiment described above includes a catalyst that is positioned upstream of the EGR flow sensor to purify soiling substances in the EGR gas. When the status of the EGR flow sensor is properly controlled in accordance with the conditions of the catalyst, the EGR flow sensor is less likely to be affected by the soiling substances in exhaust under any circumstances of the EGR path. This makes it possible to prevent a decrease in the accuracy of EGR gas flow rate detection, thereby preventing the deterioration of engine combustion state and exhaust as well. Further, stable combustion status can be achieved to provide improved fuel efficiency.

The present invention is suitable particularly for a diesel engine. However, the present invention is also applicable to a gasoline engine having an external EGR system. It should also be noted that the present invention can be applied to a stationary diesel engine as well as to a vehicle diesel engine.

What is claimed is:

1. An exhaust gas recirculation system for an engine, comprising:
    an exhaust gas recirculation path for establishing communication between an exhaust path and an intake path of an engine and recirculating part of exhaust gas back into the intake path;
    exhaust gas flow rate detection means for detecting the rate of an exhaust gas flow in the exhaust recirculation path;
    an exhaust gas flow control valve for controlling the rate of an exhaust gas flow in the exhaust recirculation path; and
    a catalyst that is installed upstream of the exhaust gas flow rate detection means to purify soiling substances in the exhaust gas,
    wherein the operating status of the exhaust gas flow rate detection means is controlled while using a signal in accordance with the conditions of the catalyst as one input.

2. The engine control device according to claim 1, wherein, when the catalyst is inactive, an exhaust gas flow rate detection function of the exhaust gas flow rate detection means is disabled.

3. The engine control device according to claim 1, wherein, when the catalyst is inactive, control is exercised to place the exhaust gas flow rate detection means in a soilure protection mode.

4. The engine control device according to claim 1, wherein, when the catalyst is active, control is exercised to place the exhaust gas flow rate detection means in a flow rate detection mode.

* * * * *